Patented Sept. 19, 1950

2,522,534

UNITED STATES PATENT OFFICE 2,522,534

ISOLATION OF PECTINIC ACIDS

Harry S. Owens, Berkeley, and Harry Lotzkar, Los Angeles, Calif., assignors to the United States of America as represented by the Secretary of Agriculture No Drawing. Application January 30, 1948, Serial No. 5,478

6 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to low-methoxyl pectinic acids, and more particularly to the isolation thereof.

An object of this invention is to provide a process for preparing low-methoxyl pectinic acids in solid form.

Another object of the invention is to provide a process for preparing low-methoxyl pectinic acids in solid form by a continuous process.

A further object of the invention is to provide a process for preparing low-methoxyl pectinic acids in solid form wherein these compounds are precipitated in film form and further processed while in that state.

Other objects and advantages will be apparent from the description of the invention.

In the copending patent application of R. M. McCready, H. S. Owens, and W. D. Maclay, Serial No. 616,445, filed September 14, 1945, which was granted on September 7, 1948, as Patent No. 2,448,818, there is disclosed a process for isolating low-methoxyl pectinic acids. It is shown therein that these materials can be isolated simply by adding a sufficient quantity of a mineral acid to an aqueous solution of the low-methoxyl pectinic acid to establish a pH not exceeding about 2, preferably about 1.5, whereby the low-methoxyl pectinic acid is precipitated and can easily be separated, as by straining. The precipitate is then pressed and dried to obtain the low-methoxyl pectinic acid in convenient, stable form. Our process represents an improvement over this process, particularly in that it is adapted to continuous operation.

According to the invention, an aqueous solution of a low-methoxyl pectinic acid, said acid being present in the solution in a concentration of at least about 2%, is extruded in a thin stream having a thickness not greater than about 0.3 mm. into a bath of mineral acid maintained at a pH not exceeding about 2, whereby a thin, self-supporting film of low-methoxyl pectinic acid is formed. This film is conducted out of the acid bath, washed to remove acid, and then dried. If desired, a partially neutralized low-methoxyl pectinate product can be formed by contacting the partially dried film with ammonia gas. The low-methoxyl pectinic acid employed in the process may be one which has been prepared by acid, alkaline, or enzymic de-methoxylation.

Our process has the advantage that the low-methoxyl pectinic acid is precipitated in the form of a thin film which can be readily subjected to further treatment. Thus, the material can be handled on rolls or pulleys and no labor is required as in handling bulk precipitates. The film can be passed through a washing bath to remove excess acid, through rolls to squeeze out excessive moisture, through a dryer, and so forth, all in a continuous manner without the necessity for manual handling. This type of operation is to be contrasted to treatment of a bulk precipitate of low-methoxyl pectinic acid where manual handling in strainers, pressing devices, washers, and driers is mandatory because of the thick nature of the precipitate rendering the use of pumps or pipes impossible.

It is to be noted that the instant invention deals with low-methoxyl pectinic acids. These compounds are to be distinguished from the related compounds pectin and pectic acid. Pectin is a polygalacturonide prepared from plant extracts by alcohol, acetone, or metallic salts precipitation with no attempt to modify its natural methoxyl content. Pectic acid is a completely de-methoxylated pectin, that is, the pectin nucleus is retained but the carbomethoxy groups (—COOCH$_3$)

have been de-esterified to carboxyl groups (—COOH)

Low-methoxyl pectinic acids, the starting materials of the instant invention, are derived from pectin (or pectin source materials) by partial de-methoxylation thereof and contain both carboxyl groups and carbomethoxy groups. The low-methoxyl pectinic acids which have been prepared by acid or alkaline de-methoxylation and have a methoxyl content of about from 2% to about 5% and the low-methoxyl pectinic acids which have been prepared by enzymatic de-methoxylation and have a methoxyl content of about from 2% to about 7%, are the most valuable for many commercial uses such as for making low-sugar jellies, milk puddings, etc.

The low-methoxyl pectinic acids to be isolated by the instant technique can be prepared by any of the usual methods. Pectin extracts obtained from vegetable source materials can be subjected to partial de-methoxylation by acid, base, or enzymic methods. Further, partial de-methoxylation can be carried out directly on pectin source materials, such as apple pomace, citrus peel, pear pomace, carrots, pea hulls, sugar beets, and so forth.

However, regardless of how the low-methoxyl pectinic acid is prepared, the starting solution should be of at least about 2% concentration. The concentration may be as high as desired, limited only by the increasing viscosity of the solution. Since the solution must be forced through a narrow orifice, the viscosity should be low enough to allow use of a normal sized pump. In general, solutions of about from 2% to 10% are suitable.

The starting solution need not necessarily contain the low-methoxyl pectinic acid as such, but this material may be present as a salt. Thus, in conventional processes for preparing low-methoxyl pectinic acids by alkaline or enzymatic de-methoxylation, the pectinic acids are obtained as an aqueous solution of their ammonia or alkali-metal salts. In this description, therefore, when reference is made to an aqueous solution of a low-methoxyl pectinic acid, it is meant that the solution contains a low-methoxyl pectinic acid either in the acid state or in the partially or completely neutralized state, that is, the starting material may be a solution containing the pectinic acids as such, alkali-metal salts of the pectinic acids, ammonium salts of the pectinic acids, alkali-metal acid salts of the pectinic acids, ammonium acid salts of the pectinic acids, and so forth.

As stated heretofore, the aqueous solution of the low-methoxyl pectinic acid is extruded into the mineral acid bath. In general, the solution should be extruded in a thin stream substantially rectangular in cross-section. Although it may be as wide as desired, its thickness should not be greater than about 0.3 mm. This stream may be produced in several different ways. The preferred method involves extrusion of the solution through a die. To this end, the solution is pumped into a die which has an orifice substantially rectangular in cross-section. Since a film of thickness not greater than about 0.3 mm. is desired, the short dimension of the orifice should not be greater than about 0.3 mm. The long dimension of the orifice is not critical. Since a wide film contains more material, such films are desirable as more material can be thus processed in any given time and the long dimension of the orifice can be as great as the apparatus will allow. If a single wide orifice is not practical then several dies may be set side by side to produce several films in parallel. The films so produced can be processed as by washing and drying in the same manner.

The acid bath required for precipitating the low-methoxyl pectinic acid contains primarily water and a mineral acid. The only critical element is that the pH should not exceed about 2. Any pH from about 2 and below is satisfactory. Generally good results are obtained at a pH of about 1.5 although this level need not be strictly maintained. To establish the proper pH, an aqueous solution of any mineral acid, such as hydrochloric acid, sulphuric acid, nitric acid, phosphoric acid, sulphurous acid, and so forth, can be used. Since the low-methoxyl pectinic acids are used in preparation of foods, such as jellies and puddings, it is advisable to use a non-toxic acid such as those listed above.

After the film has been formed in the acid bath, it is washed. This washing may be performed by conducting the film on rolls through a bath of water, or if desired, the film can be subjected to water sprays instead. The only purpose of the washing is to remove liquid from the acid bath which adheres to the film. If this material is not removed it may cause de-methoxylation and/or degradation of the product.

After washing, the film is dried by conventional means, such as by passing the film through a chamber where it is subjected to a draft of warm air. Generally, it is best to avoid temperatures over 100° C. to prevent degradation of the product.

If it is desired to prepare a partially neutralized product, which is often desired because of its ready solubility, the film after being dried to a moisture content of about from 5% to 10% can be contacted with ammonia gas. The speed of travel and the amount of ammonia gas should be so proportioned that the material is only partially neutralized, that is, an ammonium hydrogen pectinate is formed. Generally sufficient ammonia is employed so that a 1% solution of the final product will have a pH of about from 4 to 5. The film, when so treated, retains its shape and form and does not need further drying.

After the film of low-methoxyl pectinic acid is dried, or after being dried and partially neutralized, it is ready for use or sale. If desired, the film can be ground to a powder, in which condition it more readily enters into solution.

The following examples illustrate the process of this invention as applied to particular materials. It is understood that these examples are submitted only by way of illustration and not limitation.

*Example I*

The starting material in this experiment was an aqueous solution of a low-methoxyl pectinic acid produced by alkaline partial de-methoxylation of a pectin extract. The low-methoxyl pectinic acid, of 3% methoxyl content, was present in a concentration of 4.5%. The solution was centrifuged to remove air bubbles and pumped through a die into an acid bath. The die had a rectangular orifice 5 cm. wide and 0.03 cm. thick. The acid bath was an aqueous solution of hydrochloric acid of 0.1 N concentration (pH about 1) contained in a lead-lined trough about 44 inches long. The film of precipitated low-methoxyl pectinic acid having the dimensions of the orifice (5 cm. wide and 0.03 cm. thick) was removed from the acid bath by a series of rolls driven at an approximate linear speed of 2.2 inches per second, and passed through a trough about 44 inches long to which fresh water was supplied. After the washing treatment, the film was drawn from the wash trough on rolls, passed to a collector, and dried in air. The dry film of low-methoxyl pectinic acid obtained was then rolled on a spool and was ready for use in a stable, convenient form.

*Example II*

The starting material in this experiment was an aqueous solution of an ammonium salt of a low-methoxyl pectinic acid produced by enzymatic de-methoxylation of pectin. The salt of the low-methoxyl pectinic acid, of 5.2% methoxyl content, was present in a concentration of 3%. The solution was centrifuged to remove air bubbles and pumped through a die into an acid bath. The die had a rectangular orifice 50 mm. wide and 0.3 mm. thick. The acid bath was an aqueous solution of hydrochloric acid of 1 N concentration contained in a lead-lined trough 44 inches long. The film of low-methoxyl pectinic acid having the dimensions of the orifice (5 mm. wide and 0.3 mm. thick) was removed from the acid bath by a series of rolls driven at an approximate linear speed of 0.47 inch per second and passed through a trough through which fresh water was continuously circulated. After the washing treatment the film was drawn from the wash trough on rolls and passed into a drier where it was exposed to a draft of air heated to 150° F. The dry film of pectinic acid was ready for use in a stable, convenient form. The dry film was produced at the rate of 19.3 grams per hour and 98% of the pectinic acid supplied was recovered in this form.

Having thus described our invention, we claim:

1. A process of producing a low-methoxyl pectinic acid in solid stable form which comprises extruding an aqueous solution of a low-methoxyl pectinic acid in a thin stream into a bath of aqueous mineral acid maintained at a pH not exceeding about 2 whereby a thin, self-supporting film of precipitated low-methoxyl pectinic acid is formed, withdrawing said film from the acid bath, washing it and then drying it.

2. A process of producing a low-methoxyl pectinic acid in solid stable form which comprises extruding an aqueous solution of a low-methoxyl pectinic acid in a stream having a thickness not greater than about 0.3 mm., into a bath of aqueous mineral acid maintained at a pH not exceeding about 2 whereby a thin, self-supporting film of precipitated low-methoxyl pectinic acid is formed, withdrawing said film from the acid bath, washing and drying it.

3. A process of producing a low-methoxyl pectinic acid in solid stable form comprising extruding an aqueous solution of a low-methoxyl pectinic acid, said pectinic acid being present in the solution in a concentration of at least about 2%, in a stream having a thickness not greater than about 0.3 mm., into a bath of aqueous mineral acid maintained at a pH not exceeding about 2, whereby a thin self-supporting film of precipitated low-methoxyl pectinic acid is formed, withdrawing said film from the acid bath, and washing and drying it.

4. The process of claim 3 wherein the mineral acid is hydrochloric acid.

5. The process of claim 3 wherein the pectinic acid has a methoxyl content from about 2% to about 7%.

6. A process of producing a low-methoxyl pectinic acid in solid, partially-neutralized, stable form comprising extruding an aqueous solution of a low-methoxyl pectinic acid, said pectinic acid being present in the solution in a concentration of at least about 2%, in a stream having a thickness not greater than about 0.3 mm., into a bath of aqueous mineral acid maintained at a pH not exceeding about 2, whereby a thin, self-supporting film of precipitated low-methoxyl pectinic acid is formed, withdrawing said film from the acid bath, washing it, drying it to a moisture content of about from 1% to 10%, and then contacting it with sufficient ammonia gas to partially neutralize it.

HARRY S. OWENS.
HARRY LOTZKAR.

REFERENCES CITED

The following references are of record in the file of this patent:

UNITED STATES PATENTS

| Number | Name | Date |
|---|---|---|
| 1,973,613 | Cowgill | Sept. 11, 1934 |
| 2,358,430 | Willaman | Sept. 19, 1944 |
| 2,380,739 | Evans et al. | July 31, 1945 |
| 2,448,818 | McCready | Sept. 7, 1948 |